FIG. 1

INVENTORS.
MAKOTO KIKUCHI,
TOYOAKI SAEKI,

INVENTORS
MAKOTO KIKUCHI,
TOYOAKI SAEKI,

BY *Berman, Davidson & Berman,*
ATTORNEYS

INVENTORS.
MAKOTO KIKUCHI,
TOYOAKI SAEKI,

BY Berman, Davidson & Berman,
ATTORNEYS.

United States Patent Office 3,619,951
Patented Nov. 16, 1971

1

3,619,951
AUTOMATIC LOADING AND UNLOADING DEVICE FOR MACHINE TOOL OF THE TYPE HAVING AN EXTENSIBLE ARM
Makoto Kikuchi and Toyoaki Saeki, Kariya, Japan, assignors to Toyoda Koki Kabushiki Kaisha, Kariya-shi, Aichi-ken, Japan
Filed Apr. 24, 1970, Ser. No. 31,618
Claims priority, application Japan, Apr. 30, 1969, 44/33,483
Int. Cl. B24b 5/32
U.S. Cl. 51—103 WH                  19 Claims

ABSTRACT OF THE DISCLOSURE

In a single-arm type automatic loading and unloading device, wherein an unoperated workpiece is carried into an operating position from a loading chute by a loading arm and an operated workpiece is moved out of the operating position to a discharge chute, the improvement wherein the device adopts an extensible arm to swing, as being shortened or extended, from a pickup position to the operating position and from the operating position to an unloading position so that unproductive time is reduced to a minimum.

---

This invention relates to an automatic loading and unloading device for machine tool of the type having an extensible loading arm, particularly suitable for such a machine tool as comprising a support for workpieces, a grinding wheel movable towards and away from the support so as to perform a grinding operation onto a workpiece held on the support and a magnetic chuck, installed adjacent the support, operable when energized to hold the workpiece on the support, for instance, a grinding machine to operate an annular bearing race.

In a single-arm type automatic loading and unloading device heretofore in use, a single loading arm having at the top end thereof means to engage with and disengage from a workpiece is swung from a pickup position where an unoperated workpiece is engaged with the means to an operating position where the unoperated workpiece is operated by a grinding wheel, and then the single arm is swung from the operating position to an unloading position where the operated workpiece is disengaged from the means, and finally the single arm is swung back to the pickup position. Thus, particularly in loading and unloading large size workpieces, a long transfer distance for the workpiece becomes indispensable so as to prevent clash or interference between an unoperated workpiece and an operated one during the transfer operation of the device. This long transfer distance causes the whole device to be made in a larger size and also the loading arm hang over, which results in creating longer unproductive time in operation and in making the quality of the products poorer by the unbalance of the weight of the loader arm itself.

An object of this invention is, therefore, to provide an automatic loading and unloading device, wherein an extensible single loading arm is swung from a pickup position to an operating position as being shortened, and then from the operating position to an unloading position, and finally from the unloading position to the pickup position as being extended, thereby to shorten the transfer distance of a workpiece to reduce unproductive time.

Another object of this invention is to provide an automatic loading and unloading device with an extensible loading arm comprising a driving arm pivoted at one end and receiving rotatably at the other end a holding arm with a means to engage workpiece thereon, enabling to prevent an unoperated workpiece and an operated one from clash or interference with each other during operation of the device, which results in realization of designing a small size and light weight device.

Another object of this invention is to provide an automatic loading and unloading device with a simplified construction by means of adopting a hydraulic actuator on the holding arm to shorten or extend the arm in relation to the driving arm.

A further object of this invention is to provide an automatic loading and unloading device, wherein means for swinging the driving arm and means rotating the holding arm relative to the driving arm are synchronously operated, whereby an unoperated workpiece is transferred from a pickup position to an operating position along an approximately straight transfer path, thereby to be prevented from going off in the grinding wheel side and thus to be correctly located on the operating position.

A further object of this invention is to provide an automatic loading and unloading device, wherein throttle valve means regulates pressure fluid flowing into a hydraulic actuator for swinging movement of the driving arm and into a hydraulic actuator for relative rotation of the holding arm with respect to the driving arm, whereby even when one of the arms happens to reach its working end prior to the other arm, the other arm completes its operation without stopping.

Further objects and advantages of this invention will become apparent from the following description and claims, and from the accompanying drawings, wherein:

Figure 1:
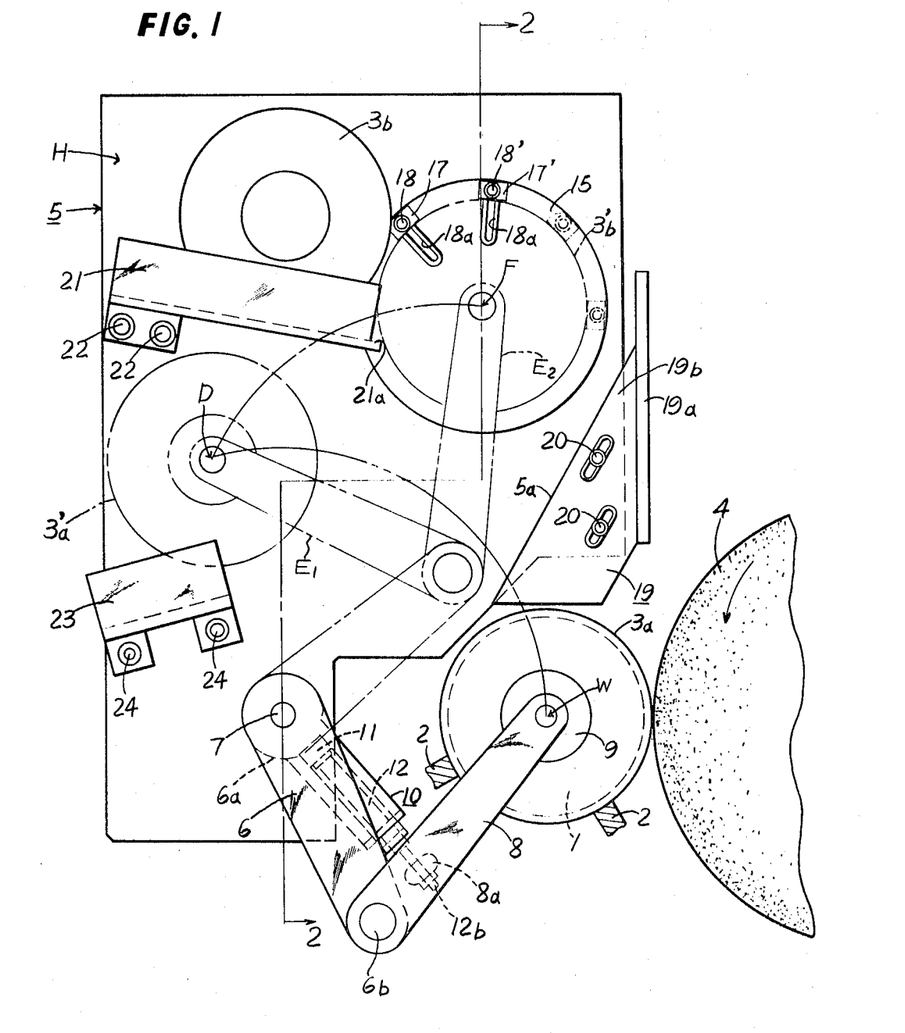
FIG. 1 is an elevational view of an improved automatic loading and unloading device according to the present invention.
Figure 4:
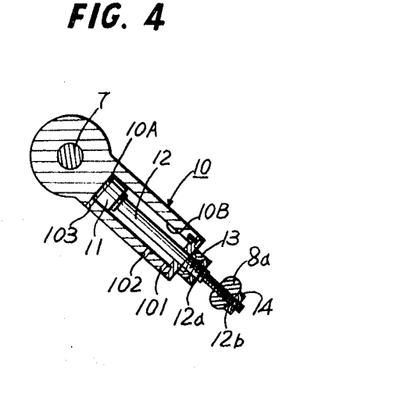
FIG. 4 is a fragmentary vertical cross-sectional view taken substantially on the line 4—4 of FIG. 2, showing the detailed construction of the hydraulic actuator.

As shown in FIG. 1, a magnetic chuck 1 is mounted on the main shaft rotatably supported in a workhead (not shown in the drawing). The workhead is adapted to be slidable along the swivel plate of a swivel table (not shown). Shoes 2, 2 are secured on the base of the swivel table and are adapted to support thereon a workpiece 3a to be operated by a grinding wheel 4. A housing 5 slidable along the swivel table is perpendicularly secured on the swivel table. The front face H of the housing 5 is in a common plane with the end face of the magnetic chuck 1. A driving arm 6 is mounted on one end of a driving shaft 7 which is rotatably received in the housing 5. One end of a holding arm 8 is pivotally connected on the external end of the driving arm 6 with a pin 6b to form a single, articulated, extensible arm. The holding arm 8 has a finger 9 at the outer end thereof to be loosely engaged in the center hole of a workpiece 3. A hydraulic actuator 10 to extend and shorten the extensible arm projects out from a boss 10a pivotally secured to the mounted end 6a of the driving arm 6 along a radius line of the driving shaft 7. In the bore of the said hydraulic actuator 10, a piston 11 is snugly and slidably received, forming a left chamber 10A and a right chamber 10B. Referring to FIG. 4, the hydraulic actuator 10 is provided with ports 103 and 101 constantly opening respectively to the left chamber 10A and the right chamber 10B and also with a port 102 usually opening to the right chamber 10B but to the left chamber 10A only when the piston 11 is forwarded to the head end of the actuator 10. A piston rod 12 extended from the piston 11 projects out from the hydraulic actuator 10. An adjustable nut 13 is threaded in the threaded portion 12a of the piston rod 12. The outer end 12b of the piston rod 12 is threaded in the portion 8a rotatably extended from the root of the holding arm 8 and clamped up with a nut 14. Thus, the reciprocal motion of the piston rod 12 causes the extending and shortening works between the driving arm 6 and the holding arm 8.

In the housing 5 is rotatably mounted a shaft 16 which has connected thereto a work divider 15 to divide an unoperated workpiece. The front face of the work divider 15 is in a common plane with the front face H of the housing 5. The work divider 15 has radially adjustable work supply hooks 17 and 17' secured on the front face thereof with bolts 18 and 18' which are received in T slots 18a.

As shown in FIG. 1, a guide member 19 is mounted in recessed portion 5a formed on the front lower portion of the housing 5 with bolts 20 and 20 in a way to be slantwise adjustable. The inside face of a vertical panel 19a of this guide member 19 guides the workpiece right to an operating position W without having it roll away from said housing 5, the outer face of the base 19b of the guide member 19 being in a common plane with the front face H of the said housing 5.

A loading chute 21 formed in a L-letter shape at its cross-section is downwardly inclined in the direction of the grinding wheel 4 and is secured with bolts 22 and 22 on the front face H of the housing 5 so that the unoperated workpiece 3b rolls down toward the work divider 15. An operated workpiece 3'a rolls out from the working equipment through an unloading chute 23 with a L-letter cross-section, which is secured on the said front face H of the housing 5, sloping down in the reverse direction to the loading chute 21.

Figure 2:
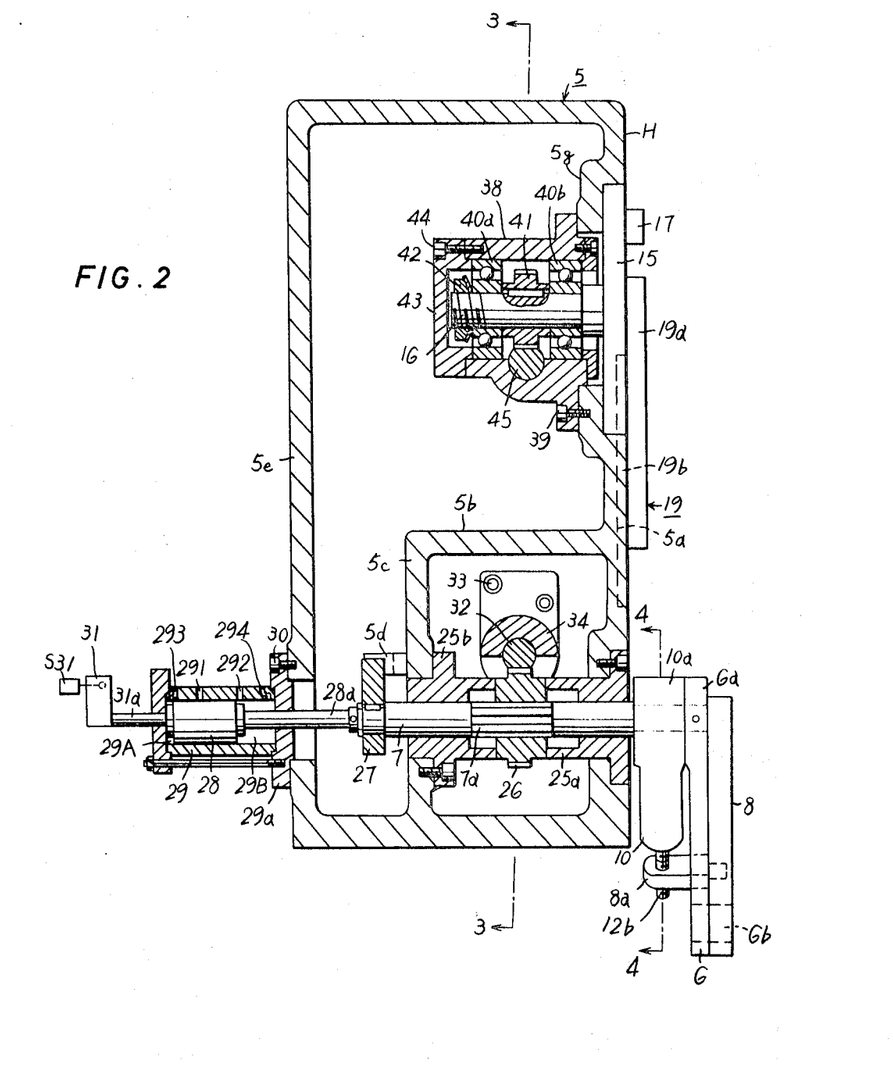
FIG. 2 is a vertical cross-sectional view taken substantially on the line 2—2 of FIG. 1.

As shown in FIG. 2, the driving shaft 7 is rotatably received by an outer sleeve 25a secured on the lower portion of the housing 5 and an inner sleeve 25b mounted in an inside wall 5c of a gear compartment 5b formed in the housing 5. A pinion 26 engages in splines 7a formed on the middle portion of the driving shaft 7. The axial movement of this pinion 26 is prevented by the inside faces of the said sleeves 25a and 25b. A stop member 27 is keyed to the inner end of the driving shaft 7. A stop member 5d is secured to the inside wall 5c of the gear compartment 5b so as to be engaged with the stop member 27 when the driving shaft 7 is rotated clockwise as viewed in FIG. 1. Upon engagement of the stop member 27 with the stop member 25, the workpiece 3a is located in an operating position W.

A piston 28 is connected to a piston rod 28a extended from the inner end of the driving shaft 7. A hydraulic actuator 29 for the driving shaft 7 is threadedly clamped on the lower portion of the outside wall 5e of the housing 5 through a flange 29a with bolts 30, slidably receiving the piston 28 to define a left chamber 29A and a right chamber 29B.

The hydraulic actuator 29 for the driving shaft has ports 293 and 294 constantly opening respectively to the left chamber 29A and the right chamber 29B, a port 291 which opens to the left chamber 29A only when the piston 28 reaches its forward end, and a port 292 which opens to the right chamber 29B only when the piston 28 reached its backward end. A dog 31 secured on the outer end of a rod 31a extended from the piston 28 operates a limit switch S31 when the driving arm 6 swings to the operating position W.

Figure 3:
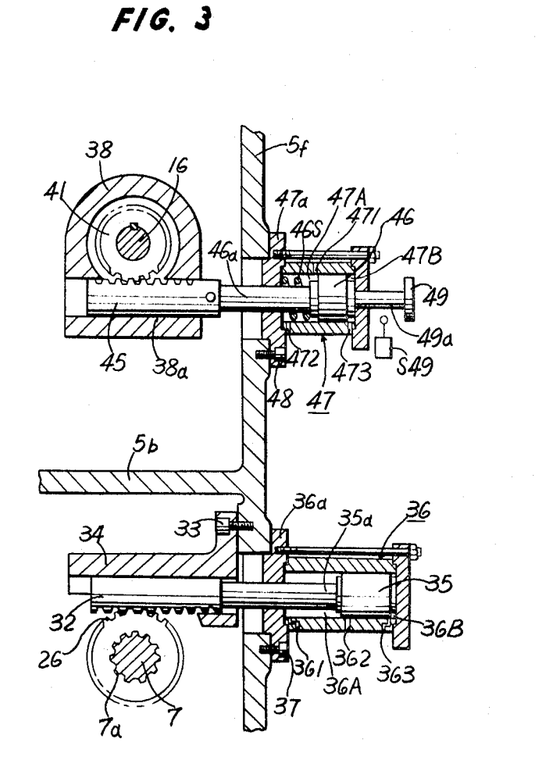
FIG. 3 is a fragmentary vertical cross-sectional view taken substantially on the line 3—3 of FIG. 2.

As shown in FIG. 3, a sleeve 34 fastened on the gear chamber 5b with bolts 33 supports movably in a horizontal direction a lower rack member 32 which is engaged with the pinion 26 of the driving shaft 7 to rotate the said pinion 26. A piston 35 is fixed on a piston rod 35a extended from the rack member 32. A hydraulic actuator 36 for the lower rack member is fastened on the lower portion of the outside wall 5f of the housing 5 through a flange 36a with bolts 37, slidably receiving the piston 35 to define a left chamber 36A and a right chamber 36B. The hydraulic actuator 36 is provided with ports 361 and 363 constantly open respectively to the left chamber 36A and the right chamber 36B, and a port 362 which opens to the right chamber 36B only when the piston 35 reached its forward end.

As shown in FIG. 2, a sleeve 38 is secured by bolts 39 to the inside of a wall 5g having at the outside thereof the work divider 15. The shaft 16 is rotatably mounted by ball bearings 40a and 40b in the sleeve 38 and has a pinion 41 keyed thereto at the middle portion thereof. The ball bearings 40a and 40b and the pinion 41 are fastened to the shaft 16 by means of a nut 42 and said sleeve 38 has a cover plate 43 secured on the inside edge thereof with bolts 44.

As shown in FIG. 3, the sleeve 38 has a guide hole 38a receiving slidably an upper rack member 45 engaged with the pinion 41 of the shaft 16 to rotate the same. A piston rod 46a is extended from the upper rack member 45 and has a piston 46 fastened thereon. A hydraulic actuator 47 is threadedly fastened on the upper portion of the outside wall 5f of the housing 5 through a flange 47a with bolts 48, slidably receiving the piston 46 to define a left chamber 47A and a right chamber 47B.

The hydraulic actuator 47 is provided with ports 472 and 473 constantly open respectively to the left chamber 47A and the right chamber 47B, and also with a port 471 which opens to the left chamber 47A only when the piston 46 reaches its backward end. A dog 49 secured on the outer end of a rod 49a extended from the said piston 46 operates a limit switch S49 when the piston 46 reaches its forward end. The piston 46 is urged by a spring 46S rightward or backward (as shown in FIG. 3).

Figure 5:
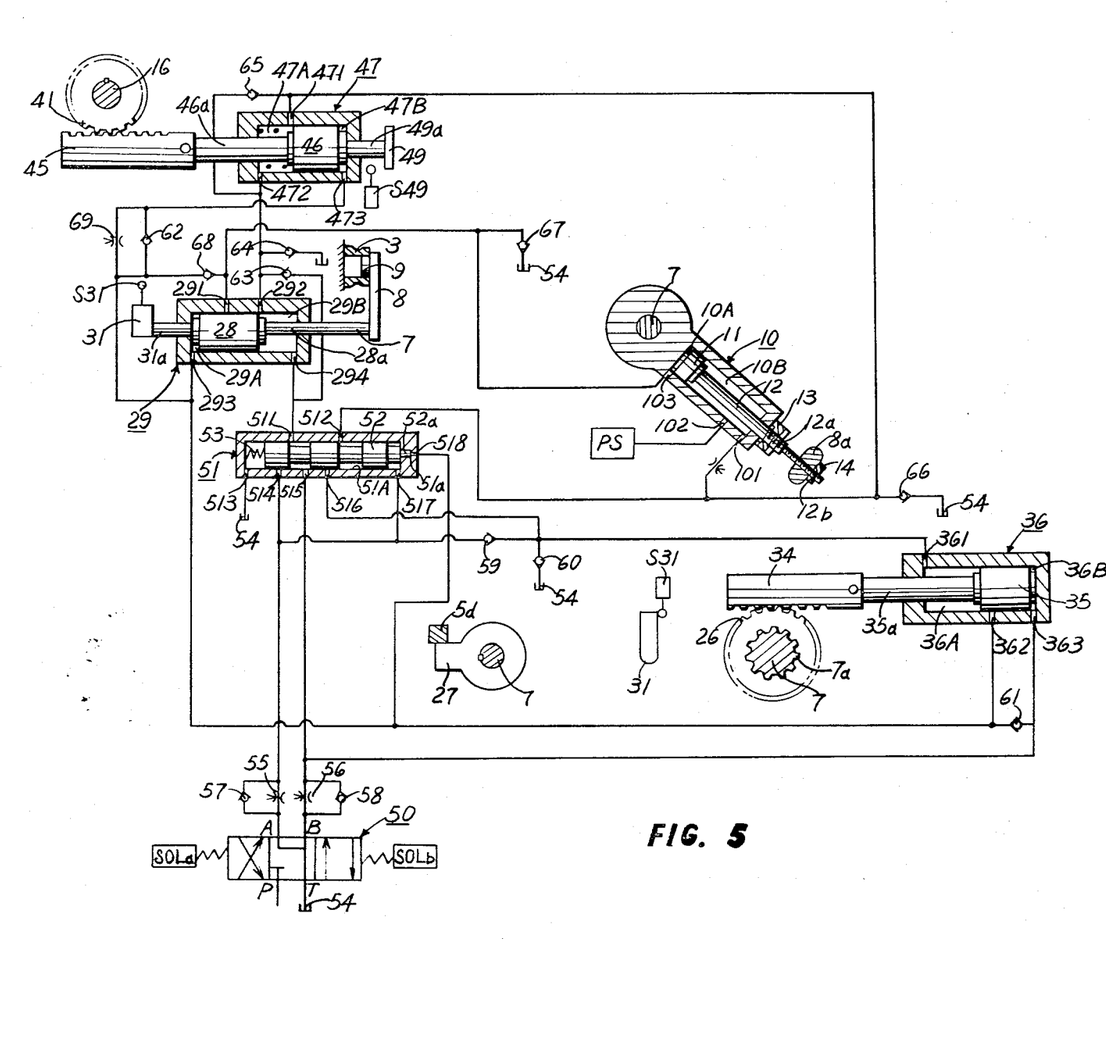
FIG. 5 is a schematic diagram of the hydraulic circuit for a drive mechanism for the embodiment of the present invention.

The hydraulic circuit of the loading and unloading mechanism is well shown in FIG. 5. A three-position four-way selector solenoid valve 50 (hereinafter referred to as a solenoid valve) with ports P, A, B, and T is changed over by energization of solenoids SOLa or SOLb. A pilot valve 51 has in the bore 51A thereof a slidable spool 52 which is normally urged by a spring 53 to the right so that a small stem portion 52a of the spool 52 is snugly inserted in the bore 51a of the pilot valve 51. The port P of the solenoid valve 50 is connected to a pressure fluid supply source (not shown in the drawing), the port T to a reservoir 54, the port A to a port 514 of the pilot valve 51 through a variable throttle valve 55, and the port B to a port 515 of the pilot valve 51 through a variable throttle valve 56.

Non-return valves 57 and 58 connected in parallel respectively to the variable throttle valves 55 and 56 prevent pressure fluid from flowing from ports A and B of the solenoid valve 50 to the ports 514 and 515 of the pilot valve 51. A port 516 of the pilot valve 51 is connected to the port 361 of the hydraulic actuator 36 for the lower rack member, the port 514 and a port 517 of the pilot valve 51 are connected each other at the outside of the pilot valve 51, a port 511 of the pilot valve 51 is connected to the port 294 of the hydraulic actuator 29 for the driving shaft, and a port 512 is connected to the port 101 of the hydraulic actuator 10 for the extensible arm through a variable throttle valve. A non-return valve 59 is placed between the port 517 of the pilot valve 51 and the port 361 of the hydraulic actuator 36 to prevent the flow of pressure fluid from the port 517 to the port 361. Another non-return valve 60 prevents pressure fluid from flowing into the reservoir 54, placed between the reservoir 54 and the port 361 of the hydraulic actuator 36. A non-return valve 61 is provided between the port 363 of the hydraulic actuator 36, and the port 362 of the actuator 36 and the port 293 of the hydraulic actuator 29 to prevent pressure fluid from flowing into the ports 362 and 293 from the port 363.

A connection is made between the said port 363 of the hydraulic actuator 36 and the port B of the solenoid valve 50 through the variable throttle valve 56 and the nonreturn valve 58. The port 362 of the hydraulic actuator 36 is connected to a port 518 of the pilot valve 51, the port 293 of the hydraulic actuator 29 and the port 473 of the hydraulic actuator 47 for the rack member 45. A non-return valve 62 is in parallel connected to a throttle valve 69 placed between the ports 293 and 473 to prevent pressure fluid from flowing into the port 473 from the port 293. The port 292 of the hydraulic actuator 29 is connected to the port 472 of the hydraulic actuator 47. A non-return valve 63 is provided between the port 511 of the pilot valve 51 and the port 472 of the hydraulic actuator 47 to prevent pressure fluid from flowing into the port 472 from the port 511. A non-return valve 64, to prevent pressure fluid from flowing into the reservoir 54 from the port 472, is placed between the reservoir 54 and the port 472.

Another non-return valve 65 is provided between the port 292 of the hydraulic actuator 29, and the port 101 of the said hydraulic actuator 10 for the extensible arm and the port 471 of the hydraulic actuator 47, preventing pressure fluid from flowing into the ports 101 and 471 from the port 292. A non-return valve 66 is connected to the port 101 of the hydraulic actuator 10, the port 471 of the hydraulic actuator 47 and the reservoir 54 to stop the flow of pressure fluid to the reservoir 54 from the ports 101 and 471. The port 291 of the hydraulic actuator 29 is connected to the port 103 of the hydraulic actuator 10. A non-return valve 67 is prepared between the port 103 and the reservoir 54 to prevent pressure fluid from flowing into the reservoir 54 from the port 103.

Another non-return valve 68 is prepared between the port 103 of the hydraulic actuator 10 and the port 293 of the hydraulic actuator 29, keeping pressure fluid away from getting into the port 103 from the port 293. The port 102 of the hydraulic actuator 10 is connected with a pressure switch PS.

Described below is an embodiment of the actual and concrete operation of the device in accordance with this invention. During the grinding operation of the workpiece 3a, the solenoid SOLb of the solenoid valve 50 is energized, meanwhile, the solenoid SOLa is deenergized. This connects the port 517 of the pilot valve 51 to the pressure fluid supply source to shift the spool 52 to the left in the figure. In this condition, the pressure fluid flows fully in the right chamber 29B of the hydraulic actuator 29 for the driving shaft 7 through the ports 514 and 511 of the pilot valve 51 to shift the piston 28 to the left or its backward end. In turn, the pressure fluid is filled through the right chamber 29B in the left chamber 47A of the hydraulic actuator 47 for the upper rack member 45 and shifts the piston 46 to the right or its backward end. The pressure fluid then shifts the piston 11 of the hydraulic actuator 10 for the extensible arm to the left or its backward end when the right chamber 10B is filled with it through the left chamber 47A of the hydraulic actuator 47 for the upper rack member 45. Further, the pressure fluid flows in the left chamber 36A of the hydraulic actuator 36 for the lower rack member 34 through the ports 512 and 516 of the pilot valve 51, shifting the piston 35 to the right or its backward end.

When such a pressure fluid circuit as mentioned is applied to the mentioned embodiment, as viewed in FIG. 1, the holding arm 8 is pulled toward the driving arm 6 by retraction of the piston 11 of the hydraulic actuator 10 for the extensible arm. At the same time, retraction of the piston 35 of the hydraulic actuator 36 for the lower rack member 34 rotates clockwise the driving arm 6 to its lower rotation end. This carries the workpiece 3a to the front side of the grinding wheel 4, where the workpiece 3a is held on the shoes 2 and 2, being attracted by the magnetic chuck 1 of the main shaft rotatable received by the workhead. At this moment, the holding finger 9 on the holding arm 8 is loosely engaged in the center hole of the workpiece 3a to hold it in the position by retraction of the piston 28 of the hydraulic actuator 29. As shown in FIG. 5, during this operation, the dog 31 on the driving shaft 7 operates the limit switch S31 to confine the workpiece 3a in the operating position W. Simultaneously, the work divider 15 is counterclockwise rotated by retraction of the piston 46 of the hydraulic actuator 47. This deposits the unoperated workpiece 3b on the loading chute 21 by the work supply hook 17.

Upon completion of the grinding operation of the workpiece 3a, by the retracting signal of the grinding wheel 4, the solenoid SOLb of the solenoid valve 50 is deenergized and the solenoid SOLa is energized. This connects the port 517 of the pilot valve 51 to the reservoir 54 to release the pressure toward the left in the figure on the spool 52, which is in turn moved to the right in the figure by a spring 53. In the hydraulic actuator 36, the pressure fluid flows in the right chamber 36B from the port 363 and the left chamber 36A is connected to the reservoir 54 through the non-return valve 59. This produces the advance of the piston 35 of the hydraulic actuator 36 to rotate the driving arm 6 counterclockwise to its upper rotation end by help of the lower rack member 34 and the pinion 26 of the driving shaft 7. This rotates the holding arm 8 up to the unloading position D and when the piston 35 stops at its forward end in the bore of the hydraulic actuator 36, the holding arm 8 holds the operated workpiece 3'a at the unloading position D.

During the above mentioned operation, the spool 52 is being urged to the right as shown in FIG. 5. Thus, the pressure fluid connected to the port 515 of the pilot valve 51 is supplied to the left chamber 47A of the hydraulic actuator 47 through the right chamber 29B of the hydraulic actuator 29, the port 292 and port 472. The flow of the pressure fluid is further continued and the right chamber 10B of the hydraulic actuator 10 for the extensible arm is filled with the pressure fluid from the left chamber 47A through the port 471 and the port 101 of the hydraulic actuator 10. This holds the piston rod 12 which is connected to the holding arm 8, the upper rack member 45 and the holding arm 8 in the same position as during the grinding operation. In this condition, the operated workpiece 3'a is held by the finger 9 of the holding arm 8 and the front side H of the housing 5 at the unloading position D. At this moment, the work divider 15 remains in the position after rotated counterclockwise.

Simultaneously, the ports 362 and 363 of the hydraulic actuator 36 are connected each other through the right chamber 36B when the piston 35 of the hydraulic actuator 36 reaches its forward end. This makes the pressure fluid flow in the port 518 of the pilot valve 51 to move the spool 52 to the left in the figure. The ports 511 and 514 of the pilot valve 51 are connected to the reservoir 54, meanwhile, a land of the spool 52 closes the port 515 to stop the supply of the pressure fluid from the port B of the solenoid valve 50. Consequently in the hydraulic actuator 29 and 47, the right chamber 29B and left chamber 47A are connected to the reservoir 54. At the same time, flow of the pressure fluid occurs from the port 362 of the hydraulic actuator 36 to the left chamber 29A of the hydraulic actuator 29 and to the right chamber 47B of the hydraulic actuator 47, producing forward motion of the respective pistons 28 and 46. The advance of the piston 28 raises up or moves the holding finger 9 to the right in FIG. 5. This operation disengages the finger 9 from the center hole of the operated workpiece 3'a which, in turn, falls on the discharge chute 23 to roll out of the device.

At the same time, the forward motion of the piston 46 rotates clockwise the work divider 15 as well as the work supply hook 17 as viewed in FIG. 1. This causes the unoperated workpiece 3b to roll down on the loading chute 21 to be held at the pickup position F by the edge 21a of the loading chute 21 and the work supply hook 17'. When the piston 46 reaches its forward end, the dog 49 operates the limit switch S49.

Upon the completion of the unloading of the operated workpiece 3'a when the piston 28 moves to its forward end, in the hydraulic actuator 29, the pressure fluid is fed from the port 291 of the left chamber 29A to the left chamber 10A of the hydraulic actuator 10 through the port 103 thereof. This advances the piston 11 of the hydraulic actuator 10 of the extensible arm. At this time, the right chamber 10B of the hydraulic actuator 10 is connected to the reservoir 54 through the ports 512 and 516 of the pilot valve 51. In this condition, only the holding arm 8 starts rotating upward, pivoted at the top end of the driving arm 6 and moves to the pickup position F as viewed in FIG. 1. (Reference is made to the dot-and-dash line $E_2$.) The advance of the piston 11 of the hydraulic actuator 10 to its forward end produces operation of the pressure switch PS by the pressure fluid supplied from the port 102. When the limit switch S49 and the pressure switch PS are together put in work, the solenoid SOL$a$ of the solenoid valve 50 is deenergized and the solenoid SOL$b$ is energized. The pressure fluid is supplied in the port 517 of pilot valve 51 through the port A of the solenoid valve 50. This keeps the spool 52 pressed to the left in the figure. Meanwhile, the pressure fluid supplied from the port A flows into the right chamber 29B of the hydraulic actuator 29 by way of the ports 514 and 511 of the pilot valve 51. The left chamber 29A opens to the reservoir 54 through the port 293, the non-return valves 61 and 58, and the port B of the solenoid valve 50. This causes the piston 28 to retract, thereby to move the driving shaft 7 to the left in the figure. Simultaneously, the holding finger 9 moves to the left as shown in FIG. 5, engaged in the center hole of the unoperated workpiece 3'b to hold it at the pickup position F.

The piston 28 retracting to its backward end, the left chamber 47A of the hydraulic actuator 47 is connected to the right chamber 29B of the hydraulic actuator 29. This causes flow of the pressure fluid into the left chamber 47A and the right chamber 47B is connected to the reservoir 54 by way of the non-return valves 62 and 61. This retracts the piston 46 to move the upper rack member 45 to the right as viewed in FIG. 5 which rotates counterclockwise in FIG. 1, the work divider 15 and the holding hooks 17 and 17'. And the work supply hook 17 holds the next unoperated workpiece on the loading chute 21.

The retraction of the piston 46 to its backward end connects the left chamber 47A of the hydraulic actuator 47 to the right chamber 10B of the hydraulic actuator 10. Thus, flow occurs into the right chamber 10B and the left chamber 10A opens to the reservoir 54 through the non-return valves 68 and 61. This causes the piston 11 to move backward to rotate the holding arm 8 counterclockwise. At the same time, the left chamber 47A of the hydraulic actuator 47 is connected to the left chamber 36A of the hydraulic actuator 36 through the ports 512 and 516 of the pilot valve 51 and the port 361 of the hydraulic actuator 36. And the pressure fluid flows into the left chamber 36A, the chamber 36B opening to the reservoir 54 through the non-return valve 58. This makes the piston 35 retract to rotate the driving arm 6 clockwise.

In conditions that the holding arm 8 rotates counterclockwise and the driving arm 6 clockwise, the unoperated workpiece 3'b is carried down direct to the operating position W. The unoperated workpiece 3'b is positively transferred to the operating position W, as being guided by means of the edge 21a of the loading chute 21 and the vertical panel 19a of the guide member 19. Then, the grinding wheel 4 is forwarded for the grinding operation onto the unoperated workpiece 3'b. Hereafter, the same processes of operations as mentioned are repeated. The hydraulic actuators 10, 29, 36 and 47 may be manually operated, when not supplied with pressure fluid from the supply source. The non-return valves 60, 64, 66 and 67 are provided for eliminating the negative pressure in the hydraulic actuators when the actuators are manually operated.

Figure 6:
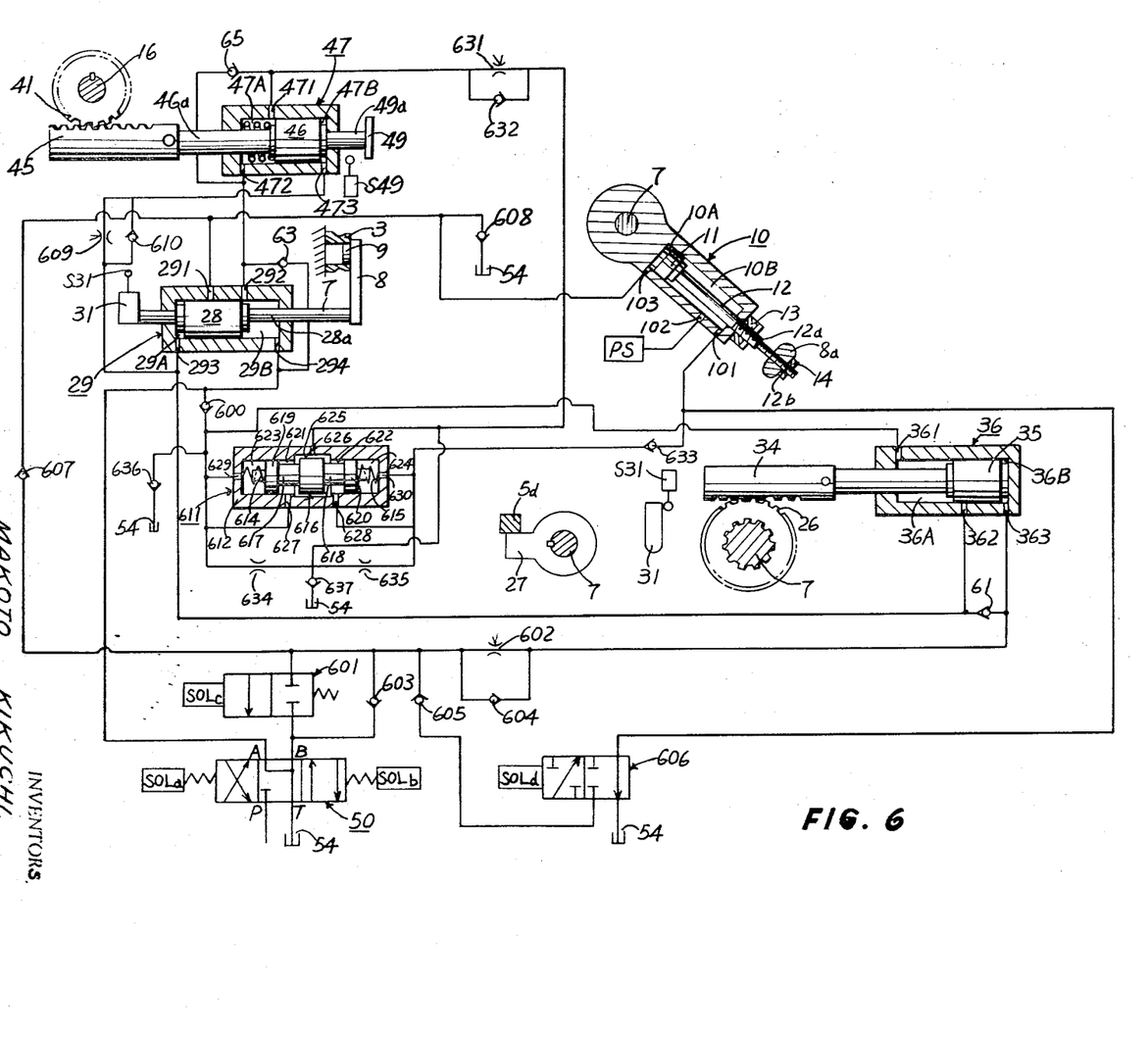
FIG. 6 is a schematic diagram of the hydraulic circuit for a drive mechanism for modified embodiment of the present invention.

FIG. 6 is to indicate modified embodiment of the actual and concrete operation of the device in accordance with this invention, wherein, the transfer path of the unoperated workpiece 3'b from the pickup position F down to the operating position W is kept approximately straight. This is realized when the rotation of the driving arm 6 and the swing of the holding arm 8 is synchronized in the process to carry the unoperated workpiece 3'b from the pickup position F to the operating position W. The hydraulic circuits are not explained herein, when they are same as described in the initial embodiment, but the corresponding marks and numbers are applied.

The port A of the solenoid valve 50 is connected to the port 294 of the hydraulic actuator 29 for the driving shaft 7 and the port A to the port 361 of the hydraulic actuator 36 by way of a non-return valve 600 which prevents flow of the pressure fluid from the port A into the port 361. The port B of the solenoid valve 50 is connected to the port 363 of the hydraulic actuator 36 through a directional control valve 601 and a variable throttle valve 602. A non-return valve 603 is connected in parallel to the directional control valve 601, preventing the pressure fluid moves into the port B from the variable throttle valve 602. Meanwhile, a non-return valve 604 connected in parallel to the variable throttle valve 602 prevents the pressure fluid from flowing into the port 363 from the directional control valve 601. Connected between the directional control valve 601 and the variable throttle valve 602 is the port 101 of the hydraulic actuator 10 through a non-return valve 605 and a directional control valve 606. And the port 291 of the hydraulic actuator 29 is connected to the directional control valve 601 through a non-return valve 607. Flows of the pressure fluid are prevented to the directional control valve 601 from the directional control valve 606 by the non-return valve 605, and to the port 291 from the directional control valve 601 by the non-return valve 607. A connection is made between the port 291 and the port 103 of the hydraulic actuator 10 and another between the port 103 and the reservoir 54 through a non-return valve 608. This non-return valve 608 is to prevent the pressure fluid from going into the reservoir 54 from the port 103. The port 293 of the hydraulic actuator 29 is connected to the port 362 of the hydraulic actuator 36 and the port 362 to the port 363 through the non-return valve 61 which prevents the pressure fluid from flowing into the port 362 from the port 363. The port 293 opens to the port 473 of the hydraulic actuator 47 through a variable throttle valve 609 which is connected to a non-return valve 610 in parallel. This non-return valve 610 prevents the pressure flow into the port 473 from the port 293. The port 292 of the hydraulic actuator 29 is connected to the port 472 of the hydraulic actuator 47, and also to the port 294 by way of the non-return valve 63. This non-return valve 63 prevents the pressure fluid from the port 294 to the port 292.

A numeral 612 indicates the housing of a flow dividing valve 611. A spool 613 is snugly and slidably engaged in the bore of the housing 612. Compression springs 614 and 615 are provided between the both ends of the spool 613 and the inside wall of the housing 612 to keep the spool 613 normally centered in the bore of the housing 612. The spool 613 has a land 616 at the center thereof and other two lands 619 and 620 with small-stem-portions 617 and 618 inbetween. A chamber 621 is formed between the land 619 and the center land 616 wihch also works to form another chamber 622 between the land 620. The outsides of the lands 619 and 620 make other chambers 623 and 624 inbetween respectively with the inside wall of the housing 612. Formed is a pocket 625 between the chambers 621 and 622 and this pocket 625 has a port 626. The center land 616 of the spool 613 is normally held at the center of the pocket 625 by the force of the springs 614 and 615. The chambers 621 and 622 are provided respectively with ports 627 and 628 and the chambers 623 and 624 respectively with ports 629 and 630. The port 626 of the flow dividing valve 611 is connected to the port 471 of the hydraulic actuator 47 through a variable throttle valve 631 to which a non-return valve 632 is in parallel connected preventing the pressure fluid from moving into the port 626 from the port 471. The non-return valve 65 is placed between the ports 471 and 472 to prevent flow of the pressure fluid from the port 472 to the port 471. The ports 627 and 629 of the flow dividing valve 611 are connected to each other and extended to the port 361 of the hydraulic actuator 36. The port 628 is connected to the port 630 and the port 101 of the hydraulic actuator 10 by way of a non-return valve 633. This non-return valve 633 prevents the pressure fluid from flowing into the port 628 from the port 101. A throttle valve 634 is placed between the port 361 of the hydraulic actuator 36 and the valve 633, and the variable throttle valve 631 and a throttle valve 635 is provided between the variable throttle valve 631 and the non-return valve 633. Non-return valves 636 and 637 are provided respectively between the port 361 and the reservoir 54 and between the throttle valve 631 and the resevoir 54. These non-return valves 636 and 637 prevent the pressure fluid from flowing into the reservoir 54 from the port 361 and the variable throttle valve 631.

Described hereafter is the concrete operation of the device in accordance with this invention in the application of the mentioned hydraulic circuit.

As previously explained, when the grinding operation is completed, a retracting signal of the grinding wheel 4 is issued. Then, the solenoid SOLb of the solenoid valve 50 is deenergized, meanwhile, the solenoid SOLa is energized as well as a solenoid SOLc of the directional control valve 601. This produces flow of the pressure fluid from the pressure fluid supply source to the right chamber 36B of the hydraulic actuator 36 through the port 363 thereof and the variable throttle valve 602. At the same time, the port 361 of the left chamber 36A is connected to the reservoir 54 by way of the non-return valve 600. This causes the piston 35 of the hydraulic actuator 36 to advance at a predetermined speed by the variable throttle valve 602. The forward motion of the piston 35 rotates the driving arm 6 counterclockwise. When the piston 35 reaches its forward end, the driving arm 6 stops at the unloading position. During this operation of the driving arm 6, a solenoid SOLd of the directional control valve 606 is kept energized to keep the pressure fluid flowing into the right chamber 10B of the hydraulic actuator 10 through the port 101. Thus, the holding arm 8 remains being pulled towards the driving arm 6. When the piston 35 comes to its forward end, the solenoid SOLd is deenergized, the right chamber 10B of the hydraulic actuator 10 being connected to the reservoir 54 through the port 101. The port 362 of the hydraulic actuator 36 is connected to the port 363 through the right chamber 36B so that the pressure fluid is fed into the left chamber 29A of the hydraulic actuator 29 and the right chamber 47B of the hydraulic actuator 47 respectively through the ports 293 and 473. This advances the pistons 28 and 46. At this moment, the right chamber 29B of the hydraulic actuator 29 is connected to the reservoir 54 by way of the port 294 and the port A of the solenoid valve 50 and the left chamber 47A of the hydraulic actuator 47 is also connected to the reservoir 54 through the port 472 and the non-return valve 63. In this condition, the forward motion of the piston 28 disengages the holding finger 9 of the holding arm 8 from the center hole of the operated workpiece 3'a. In turn, the operated workpiece 3'a falls on the discharge chute 23. Synchronously the forward motion of the piston 46 rotates the work divider 15 clockwise to permit waiting unoperated workpiece 3b to roll down on the delivery chute 21 to the pickup position F where the holding hooks 17 and 17' and so on hold the unoperated workpiece 3b in place. The rotating speed of the work divider 15 is adjustable by the variable throttle valve 609.

When the piston 46 reaches to its forward end, the dog 49 operates the limit switch S49. As the piston 28 reaches its forward end, the ports 293 and 291 are connected to each other by way of the left chamber 29A. This produces flow of the pressure fluid from the left chamber 29A to the left chamber 10A of the hydraulic actuator 10 through the port 103. And the piston 11 advances to rotate the holding arm 8 up to the pickup position F. When the piston 11 reaches its forward end, the pressure fluid flow from the port 102 operates the pressure switch PS. The simultaneous operation of the limit switch S49 and the pressure switch PS deenergizes the solenoid SOLa of the solenoid valve 50 and energizes SOLb. The solenoid SOLc of the directional control valve 601 remains energized.

This produces flow of the pressure fluid into the right chamber 29B of the hydraulic actuator 29 through the port A and the port 294 thereof. And the left chamber 29A is connected to the reservoir 54 by way of the port 293, the non-return valves 61 and 604, the directional control valve 601 and the port B. This makes the piston 28 retract to move the holding finger 9 of the holding arm 8 to the left as shown in FIG. 6, engaging the holding finger 9 into the center hole of the unoperated workpiece 3'b. When the piston 28 comes to its backward end, the ports 294 and 292 of the hydraulic actuator 29 are connected each other through the right chamber 29B to make the pressure fluid flow into the left chamber 47A of the hydraulic actuator 47. At the same time the right chamber 47B opens to the reservoir 54 by way of the non-return valves 610 and 61. Then, the piston 46 retracts to rotate the work divider 15 counterclockwise (in FIG. 1). This rotation of the work divider 15 works to hold the next unoperated workpiece on the delivery chute 21 by means of the holding hook 17.

When the piston 46 reaches its backward end, the port 472 and 471 of the hydraulic actuator 47 are connected each other through the left chamber 47A and the pressure fluid flows into the port 626 of the flow dividing valve 611. This divides the pressure fluid from the pocket 625 into the chambers 621 and 622 and the pressure fluid flows out of the ports 627 and 628 to be supplied to the port 361 of the hydraulic actuator 36 as well as to the port 101 of the hydraulic actuator 10. The pressure fluid is also supplied to the chambers 623 and 624 of the flow dividing valve 611 through the ports 629 and 630. Thus, the spool 613 remains centered by help of the pressure fluid filled in the chambers 623 and 624 and the springs 614 and 615 as long as the pressure force in the hydraulic actuator 36 and the hydraulic actuator 10 are well balanced. Accordingly, the pressure fluid from the pocket 625 is equally divided into the chambers 621 and 622.

When the left chamber 36A of the hydraulic actuator 36 is supplied with the pressure fluid, the piston 35 retracts to rotate the driving arm 6 clockwise (in FIG. 1). At the same time, supply of the pressure fluid into the right chamber 10B of the hydraulic actuator 10 causes retraction of the piston 11 to pull the holding arm 8 counterclockwise (in FIG. 1). During these operations, the right chamber 36B of the hydraulic actuator 36 is connected to the reservoir 54 by way of the port 363, the non-return valve 604, the directional control valve 601 and the port B of the solenoid valve 50 and the left chamber 10A of the hydraulic actuator 10 is also connected to the reservoir 54 through the port 103, the non-return valve 607 and the directional control valve 601. When the driving arm 6 reaches its clockwise rotation end and the holding arm 8 reaches its bending end, the unoperated workpiece 3'b is placed in the opening position W. As described, in the period to carry the unoperated workpiece 3'b from the pickup position F to the operating position W, the rotation of the driving arm 6 and the bending of the holding arm 8 are synchronized.

When resistance in rotating the driving arm 6 clockwise (in FIG. 1) increases, the pressure becomes in proportion higher in the left chamber 36A of the hydraulic actuator 36. This makes the fluid pressure higher in the left chamber 623 than that in the right chamber 624 of the flow dividing valve 611 to shift the spool 613 rightward in the figure. This makes the communication passage of the land 616 open larger to the chamber 621 through the pocket 625 and also makes the communication passage opening to the chamber 622 smaller. Consequently, the fluid pressure increases further in the left chamber 36A of the hydraulic actuator 36 to rotate the driving arm 6 against the increased resistance. On the other hand, when the resistance in pulling the holding arm 8 increases, the fluid pressure becomes in proportion higher in the right chamber 10B of the hydraulic actuator 10. This shifts the spool 613 leftward to make the communication passage of the land 616 open larger to the chamber 622 through the pocket 625. At the same time, the communication passage to the chamber 621 becomes narrower. In turn, the fluid pressure increases further in the right chamber 10B to have the holding arm 8 pulled toward the driving arm 6 against the increased resistance. As described, the rotation of the driving arm 6 and the bending of the holding arm 8 are synchronously operated without stops on the way. This enables the unoperated workpiece 3'b to be carried down along an approximate straight path from the pickup position F direct to the operating position W.

In case either the piston 35 of the hydraulic actuator 36 or the piston 11 of the hydraulic actuator 10 reaches its backward end prior to the other, the spool 613 is shifted by the increased fluid pressure of the piston reaching first to its backward end so that the spool 613 entirely closes the communication passage opening to the other hydraulic actuator. This stops the movement of the piston on the way in the hydraulic actuator of which the communication passage is closed.

So as to eliminate interruptions to the operations of the device, in the mentioned hydraulic circuit, the variable throttle valve 631 is connected to the left chamber 36A of the hydraulic actuator 36 by way of the throttle valve 634 and the variable throttle valve 631 is connected to the right chamber 10B of the hydraulic actuator 10 through the throttle valve 635. Consequently, the pressure fluid of which the quantity is adjusted by the throttle valves 634 or 635 flows into the hydraulic actuator that is yet on the way to its backward end by the partial shifting of the spool 613 to complete the retraction of the piston thereof. Thus, when the unoperated workpiece 3'b is delivered right to the operating position W, the grinding wheel 4 forwards for the grinding operation and the operations mentioned are repeated.

The non-return valves 608, 636 and 637 are provided for the manual operation of the pistons to release the negative pressure in the hydraulic actuators when the pressure fluid supply source is closed to the hydraulic circuit. In emergent cases, the solenoid SOLc of the directional control valve 601 can be deenergized to close up the right chamber 36B of the hydraulic actuator 36 for the lower rack member and the right chamber 10B of the hydraulic actuator 10 for the extensible arm. This enables to let the driving arm 6 and the holding arm 8 stop certainly and remain at the places they stop without keeping or starting their movements by the weights of themselves.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. A loading and unloading device for a machine tool having means to support a workpiece at an operating position for an operation thereon, comprising means to hold a workpiece to a pick-up position at a loading chute, discharge means to receive a workpiece at an unloading position after an operation is completed, an extensible workpiece carrier having a cycle of turning movement from said pick-up position to said operating position during which said carrier is shortened, from said operating position to said unloading position during which said carrier remains shortened, and from said unloading position to said pick-up position during which said carrier is extended, means to turn said workpiece carrier, and means to shorten and extend said carrier during the turning movement.

2. A loading and unloading device for a machine tool according to claim 1, wherein said workpiece carrier turns in a path lying in a plane while moving between said pick-up, operating and unloading positions, and said carrier is shiftable out of said plane toward the pick-up position when it reaches this position and out of said plane away from the said unloading position when it reaches the latter position.

3. A loading and unloading device for a machine tool according to claim 2, wherein said workpiece carrier includes means to engage a workpiece before operation at the pickup position and to disengage a workpiece after operation at the unloading position.

4. A loading and unloading device for a machine tool according to claim 3, wherein said extensible workpiece carrier includes a driving arm and a holding arm, said driving arm being pivoted at one end so as to swing in a limited arc lying in a plane and being shiftable out of said plane toward and away from the plane of said pick-up position when at the upper end of said arc, said holding arm being pivoted at one end to the free end of said driving arm and having means to engage a workpiece at its other end, and said means to shorten and extend the carrier acting to pull and extend said holding arm toward and away from said driving arm by swinging the holding arm on its pivot while the driving arm is turning or stationary.

5. A loading and unloading device for a machine tool according to claim 4, wherein there is additionally provided a housing for said means to turn the carrier, said housing having one face lying in a common plane with said means for supporting a workpiece at the operating position, said loading chute being secured above said discharge chute on said face of the housing, the unpivoted end of said holding arm moving in a plane from said pickup position at said loading chute to a position adjacent the operating position and subsequently from said operating position to said unloading position adjacent said discharge chute while said holding arm is pulled toward said driving arm during the turning movements of the driving arm, and the unpivoted end of said holding arm being swingable in a plane from said unloading to said pick-up positions while being extended away from said driving arm, and means to shift said driving arm toward and away from the plane of said pick-up position when at the upper end of its arc of turning movement to thereby effect holding and release of said workpiece engaging and disengaging means on said holding arm.

6. A loading and unloading device for a machine tool as claimed in claim 5, wherein said means to shorten and extend the carrier comprises a pressure fluid actuator having a housing pivotally secured to the driving arm and a piston and piston rod, the latter protruding from said housing of the actuator and being connected to said holding arm.

7. A loading and unloading device for a machine tool as claimed in claim 5, wherein said housing for said means to turn the carrier has at one side thereof a guide member to guide workpieces being moved toward said operating position by said holding arm.

8. A loading and unloading device for a machine tool as claimed in claim 7, wherein said guide member is adjustable with respect to said housing so as to accommodate workpieces having different diameters or size.

9. A loading and unloading device for a machine tool according to claim 5, wherein is additionally provided a work divider including a disc rotatably secured in front of said loading chute on said face of the housing with the front face of said divider lying in a common plane with said face of the housing, and holding hooks on the face of said disc to hold workpieces, and means to rotate said work divider clockwise and counterclockwise when said driving arm is shifted to effect engagement and disengagement of said means to hold workpieces on said holding arm.

10. A loading and unloading device for a machine tool as claimed in claim 9, wherein said holding hooks on said disc of the work divider are movably secured to said disc so that they may be adjusted along radii thereof to accommodate workpieces of different diameters or sizes.

11. A loading and unloading device for a machine tool as claimed in claim 5, wherein said means to turn the driving arm includes an axially shiftable driving shaft rotatably journaled in and having an outer end which juts out beyond said face of the housing, said driving arm having one end thereof mounted on the outer end of said driving shaft and said means to shift said driving arm at the upper end of its arc of movement acting to shift said shaft axially to and from said face of the housing.

12. A loading and unloading device for a machine tool as claimed in claim 11, wherein said driving shaft has a pinion slidably but non-rotatable mounted thereon, a rack member engaged with said pinion at right angle to reciprocatively rotate the pinion and the driving shaft, said means to hold a workpiece on said holding arm comprising a finger loosely engageable in and removable from a center hole of the workpiece, said means to shift said driving arm toward and away from the pick-up position including a first pressure fluid actuator operably connected to said driving shaft to shift the driving shaft axially and thereby effect engagement and disengagement of said finger of the holding arm from a workpiece, a second pressure fluid actuator to reciprocate said rack member, and said means to shorten and extend the carrier including a third pressure fluid actuator having a housing pivotably secured to the said driving arm and a piston and rod, the latter protruding from said actuator housing and being connected to said holding arm to pull and extend the holding arm to and from the driving arm while the driving arm is turned by said driving shaft.

13. A loading and unloading device for a machine tool as claimed in claim 12, wherein is additionally provided a work divider comprising a second driving shaft with a second pinion fastened thereon and rotatably journaled within said housing, a disc secured on the outer end of said second driving shaft adjacent said outer face of the housing, a plurality of holding hooks adjustably mounted on the face of the disc to deliver workpieces deposited in the loading chute one after another to said pickup position, a second rack member engaged with said second pinion at a right angle thereto so as to reciprocate the second driving shaft, and a fourth pressure fluid actuator operable to reciprocate said second rack member so as to rotate said disc in synchronism with the axial shifting of said first driving shaft and said driving arm.

14. A machine tool having means to support a workpiece for an operation at an operating position thereon, a grinding wheel advanceable and retractable from said supporting means in a pre-set cycle to grind workpieces, and a magnetic chuck adjacent said supporting means operable when energized to hold a workpiece on said supporting means, in combination with a loading and unloading device comprising a loading chute adapted to hold workpieces, an unloading position adjacent a discharge chute adapted to receive workpieces after grinding, both of said chutes lying in a common plane with said workpiece supporting means, a driving arm pivotally mounted at one end and being swingable in a predetermined arc parallel to said common plane, means to reciprocatively turn said driving arm in said arc, a holding arm pivotally connected at one end to the free end of said driving arm and provided with a finger at its other end to engage a workpiece, means to shift said driving arm at the upper end of its arc of turning movement toward and away from said common plane so as to engage said finger with a workpiece at a pick-up position adjacent an end of said loading chute, means to pull and extend said holding arm toward and away from said driving arm, said holding arm being carried by turning movement of the driving arm in its plane from said pick-up position to said operating position and during said turning being pulled toward the driving arm, said holding arm being carried by said turning movement of the driving arm in its plane from said operating position to said unloading position while remaining pulled toward the driving arm, and said holding arm being swingable in its plane from said unloading position to said pick-up position while being extended away from the driving arm, means responsive to the arrival of said holding arm at the pick-up position to shift said driving arm and engage said finger of the holding arm in a workpiece, means responsive to shift of said driving arm toward said common plane to turn the driving arm to the lower end of its arc of movement and to pull said holding arm toward the driving arm so as to deliver a workpiece held by said finger onto said workpiece supporting means, means responsive to the arrival of the holding arm at the operating position to start advancing motion of said grinding wheel toward said workpiece supporting means, means responsive to the completion of the grinding operation to turn said driving arm to the upper end of its arc of movement, means to shift said driving arm outward from said common plane to effect disengagement of said finger from a workpiece after grinding when said holding arm reaches said unloading position, and means to return said holding arm to said pick-up position responsive to the shift of the driving arm.

15. A machine tool as claimed in claim 14, wherein said loading and unloading device is provided with a work divider comprising a disc journaled for reciprocative rotation in front of said loading chute, holding hooks adjustable mounted on the face of said disc to deliver workpieces deposited in said loading chute one after another to said pick-up position, and means to rotate said disc clockwise and counterclockwise in response to said shift of the driving arm at the upper end of its arc of turning movement.

16. A machine tool as claimed in claim 14, wherein said means to turn the driving arm is a first hydraulic actuator, said means to shift the driving arm toward and away from said common plane is a second hydraulic actuator, said means to pull and extend said holding arm to and from the driving arm during the turning of the driving arm is a third hydraulic actuator, control valve means operatively connected by pressure fluid passages to said hydraulic actuators, means to operate the second hydraulic actuator responsive to the arrival of said holding arm in said pick-up position to shift said driving arm so as to effect engagement of sad finger of the holding arm with a workpiece, means to operate the first and third hydraulic actuators through said control valve means responsive to said shift of the driving arm to turn the driving arm to the lower end of its arc of movement with said holding arm being pulled toward the driving arm so as to reach said operating position, switch means to select different pressure fluid passages to said hydraulic actuators by way of said control valve means in response to retraction of said grinding wheel, means to operate the first hydraulic actuator responsive to the operation of said switch means to turn said driving arm to the upper end of its arc of movement, means to operate the second hydraulic actuator through said control valve means responsive to the arrival of said holding arm in said unloading position to thereby shift the driving arm outward from said common plane to effect disengagement of said finger on the holding arm from an opening in the workpiece, means to operate the third hydraulic actuator through said control valve means responsive to the shift of said driving arm outward from said common plane to turn said holding arm toward said pick-up position and means to operate said switch means when said holding arm returns to the pick-up position.

17. A machine tool as claimed in claim 16, wherein said loading and unloading device is provided with a work divider comprising a disc journaled for reciprocative rotation in front of said loading chute, a plurality of holding hooks mounted on the face of said disc to deliver unoperated workpieces one after another to said pick-up position by the rotation of said disc, a fourth hydraulic actuator operatively connected to said disc and to said first, second and third hydraulic actuators through said control valve means so as to rotate said work divider, means to operate the fourth actuator through said control valve means in response to the shifting of said driving arm at the upper end of its arc of turning to produce a clockwise rotation of said work divider so as to move an unoperated workpiece into said pick-up position, and means to operate the fourth hydraulic actuator through said control valve means in response to engagement of said finger of the holding arm with an unoperated workpiece at the pick-up position to produce the counterclockwise rotation of said work device so as to hold unoperated workpieces in place in said loading chute.

18. A machine tool as claimed in claim 16, wherein is additionally provided a flow dividing valve means operatively connected to said hydraulic actuators so as to control pressure fluid supply to the first and third hydraulic actuators to be always well balanced, and means to operate the first and third hydraulic actuators through said flow dividing valve means in response to shift of the driving arm so as to effect engagement of said finger of the holding arm with a workpiece to turn the driving arm to the lower end of its arc of movement and to synchronously pull the holding arm toward the driving arm so that said finger on the holding arm moves to said operating position along an approximately straight path.

19. A machine tool as claimed in claim 18, wherein throttle valve means is provided in the pressure fluid passages leading to the first and third hydraulic actuators, said throttle valve means controlling through said flow dividing valve means the flow of pressure fluid to be supplied into the first and third hydraulic actuators.

References Cited
UNITED STATES PATENTS

| | | | |
|---|---|---|---|
| 2,802,586 | 8/1957 | Wingard | 214—1 BD X |
| 2,912,798 | 11/1959 | Seidel | 51—103 WH |
| 3,000,516 | 9/1961 | Dixon | 214—1 BD |
| 3,226,886 | 1/1966 | Seidel | 51—215 |
| 3,561,614 | 2/1971 | Tezuka | 214—1 BD |

DONALD G. KELLY, Primary Examiner

U.S. Cl. X.R.

51—215 R; 214—1 BD, 147 T